(12) United States Patent
Nakagoshi et al.

(10) Patent No.: US 11,560,862 B2
(45) Date of Patent: Jan. 24, 2023

(54) ENGINE CONTROL DEVICE

(71) Applicant: TOYOTA JIDOSHA KABUSHIKI KAISHA, Aichi-ken (JP)

(72) Inventors: Shinichi Nakagoshi, Miyoshi (JP); Shinji Yoshioka, Toyota (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 0 days.

(21) Appl. No.: 17/542,495

(22) Filed: Dec. 6, 2021

(65) Prior Publication Data
US 2022/0213844 A1 Jul. 7, 2022

(30) Foreign Application Priority Data
Jan. 7, 2021 (JP) .............................. JP2021-001537

(51) Int. Cl.
| | | |
|---|---|---|
| *F02D 41/14* | (2006.01) | |
| *F02B 37/18* | (2006.01) | |
| *F01N 13/00* | (2010.01) | |
| *F01N 3/10* | (2006.01) | |

(52) U.S. Cl.
CPC ......... *F02D 41/1454* (2013.01); *F01N 3/101* (2013.01); *F01N 13/008* (2013.01); *F02B 37/18* (2013.01); *F02D 2200/101* (2013.01)

(58) Field of Classification Search
CPC ............. F02D 41/1454; F02D 41/0007; F02D 2200/101; F02B 37/18; F01N 3/101; F01N 3/0253; F01N 13/008; F01N 11/00; F01N 11/007; F01N 2430/06; F01N 2430/08; Y02T 10/12; Y02T 10/40
See application file for complete search history.

(56) References Cited

U.S. PATENT DOCUMENTS

| | | | |
|---|---|---|---|
| 9,541,014 B2* | 1/2017 | Glugla | ..................... F02D 37/02 |
| 10,006,382 B2* | 6/2018 | Tsunooka | ............ F02D 41/1456 |
| 10,415,457 B2* | 9/2019 | Xu | .............................. F02D 9/02 |
| 2011/0126812 A1 | 6/2011 | Miyashita | |
| 2013/0226437 A1* | 8/2013 | Kato | ................... F02D 41/1441 |
| | | | 701/104 |

FOREIGN PATENT DOCUMENTS

| | | |
|---|---|---|
| JP | 2010127122 A | 6/2010 |
| JP | 4952847 B2 | 6/2012 |
| WO | 2010058461 A1 | 5/2010 |

\* cited by examiner

*Primary Examiner* — Audrey B. Walter
*Assistant Examiner* — Dapinder Singh
(74) *Attorney, Agent, or Firm* — Hauptman Ham, LLP

(57) ABSTRACT

An engine control device is configured to perform an air-fuel ratio main feedback process based on an output of a front air-fuel ratio sensor, an air-fuel ratio sub feedback process of alternately switching a target air-fuel ratio between a rich side target air-fuel ratio and a lean side target air-fuel ratio based on an output of a rear air-fuel ratio sensor, and a catalyst air-fuel ratio correction process of, when an opening degree of a wastegate valve is large, correcting the target air-fuel ratio to be the air-fuel ratio on the rich side with respect to the air-fuel ratio when the opening degree is small.

4 Claims, 10 Drawing Sheets

ENGINE CONTROL DEVICE

CROSS-REFERENCE TO RELATED APPLICATION

This application claims priority to Japanese Patent Application No. 2021-001537 filed on Jan. 7, 2021, incorporated herein by reference in its entirety.

BACKGROUND

1. Technical Field

The present disclosure relates to an engine control device.

2. Description of Related Art

In engines, such as an on-vehicle engine, there is an engine on which a three-way catalyst is supported and that includes a catalyst device for exhaust gas cleaning having an oxygen storage capacity. Further, in the engines including such a catalyst device, there is an engine in which air-fuel ratio sensors are installed on an upstream side and a downstream side of the catalyst device in an exhaust passage, respectively. Moreover, as a control device of such an engine, there is an engine that performs an air-fuel ratio control through two feedback processes of main feedback based on an output of the air-fuel ratio sensor on the upstream side of the catalyst device and sub feedback based on an output of the air-fuel ratio sensor on the downstream side of the catalyst device.

WO 2010/058461 discloses an engine control device that performs the air-fuel ratio control through the two feedback processes described above in an engine including a turbocharger equipped with a wastegate valve. Note that in the engine control device disclosed in WO 2010/058461, in a case where the air-fuel ratio control is performed, a time from when an air-fuel ratio of an air-fuel mixture that is combusted in a combustion chamber is changed to when a change due to the change appears in an output of a front air-fuel ratio sensor is measured. An arrival time of the exhaust gas from the combustion chamber to the front air-fuel ratio sensor is changed depending on opening and closing of the wastegate valve. Therefore, in the engine control device disclosed in WO 2010/058461, the time is measured when the wastegate valve has an opening degree equal to or less than a certain value.

SUMMARY

Depending on opening and closing of a wastegate valve, the way the exhaust gas hits the catalyst device is changed. Moreover, due to an influence of the change, an emission of the engine may be deteriorated.

An aspect of the present disclosure relates to an engine control device applied to an engine including a combustion chamber in which an air-fuel mixture is combusted, an intake passage through which an intake gas introduced into the combustion chamber flows, an exhaust passage through which an exhaust gas generated by combustion of the air-fuel mixture in the combustion chamber flows, a turbocharger, an injector, a catalyst device for exhaust gas cleaning. The turbocharger includes a compressor installed in the intake passage and a turbine installed in the exhaust passage. The injector is configured to inject a fuel in the intake gas. The catalyst device is installed on a downstream side portion of the turbine in the exhaust passage, a front air-fuel ratio sensor, and a rear air-fuel ratio sensor. The catalyst device supports a three-way catalyst and has an oxygen storage capacity. The front air-fuel ratio sensor is installed on an upstream side portion of the catalyst device in the exhaust passage. The rear air-fuel ratio sensor is installed on a downstream side portion of the catalyst device in the exhaust passage. In the engine, the turbine includes a turbine wheel configured to rotate in response to a flow of the exhaust gas, a bypass passage that bypasses the turbine wheel and allows the exhaust gas to flow, and a wastegate valve for changing a flow passage area of the exhaust gas of the bypass passage. Moreover, the engine control device is configured to perform an air-fuel ratio main feedback process of performing a feedback control of a fuel injection amount of the injector based on an output of the front air-fuel ratio sensor such that an air-fuel ratio of the air-fuel mixture combusted in the combustion chamber is made to a target air-fuel ratio, an air-fuel ratio sub feedback process of alternately switching the target air-fuel ratio between a rich side target air-fuel ratio that is an air-fuel ratio on a rich side with respect to a stoichiometric air-fuel ratio and a lean side target air-fuel ratio that is an air-fuel ratio on a lean side with respect to the stoichiometric air-fuel ratio, and deciding switching timing of the target air-fuel ratio based on an output of the rear air-fuel ratio sensor, and a catalyst air-fuel ratio correction process of, when an opening degree of the wastegate valve is large, correcting the target air-fuel ratio to be the air-fuel ratio on the rich side with respect to the air-fuel ratio when the opening degree is small.

In the engine control device, in the air-fuel ratio sub feedback process, the target air-fuel ratio is alternately switched between the lean side target air-fuel ratio and the rich side target air-fuel ratio. During lean combustion with the lean side target air-fuel ratio as the target air-fuel ratio, the exhaust gas containing excess oxygen flows into the catalyst device. At this time, the catalyst device stores the excess oxygen in the exhaust gas to create a stoichiometric atmosphere inside, so that cleaning of the exhaust gas by the three-way catalyst is promoted. When the lean combustion continues, the catalyst device cannot eventually store excess oxygen anymore, and an outflow of the exhaust gas containing the excess oxygen, a so-called a lean failure, occurs. At this time, when the target air-fuel ratio is switched to the rich side target air-fuel ratio and rich combustion is started, the exhaust gas containing unburned fuel components flows into the catalyst device. The catalyst device at this time releases oxygen stored during the lean combustion to create the stoichiometric atmosphere inside, so that cleaning of the exhaust gas by the three-way catalyst is promoted. When the rich combustion continues, the catalyst device eventually releases all the stored oxygen, an outflow of the exhaust gas containing the unburned fuel components, a so-called a rich failure, occurs. At this time, by switching the target air-fuel ratio to the lean side target air-fuel ratio and starting the lean combustion, when the lean combustion and the rich combustion are alternately performed, a steady deviation of the air-fuel ratio in the air-fuel ratio main feedback process can be suppressed. Note that the occurrence of the lean failure and the rich failure can be confirmed from the output of the rear air-fuel ratio sensor. Therefore, in the air-fuel ratio sub feedback process, the switching timing of the target air-fuel ratio is decided based on the output of the rear air-fuel ratio sensor.

The turbine including such a bypass passage has two exhaust routes, one route passing through the turbine wheel and the other route passing through the bypass passage. A flow rate ratio of the exhaust gases passing through both routes is changed depending on the opening degree of the wastegate valve. The flow rate ratio of the exhaust gas passing through the turbine wheel is decreased as the opening degree of the wastegate valve is increased, and the flow rate ratio of the exhaust gas passing through the bypass passage is increased. Since the flow of the exhaust gas from the turbine wheel to the catalyst device is a rotational flow, the exhaust gas is evenly distributed throughout the catalyst device. On the other hand, the flow of the exhaust gas from the bypass passage to the catalyst device is a blowdown flow, and the exhaust gas is concentrated in a part of the catalyst device. Therefore, when the opening degree of the wastegate valve is large, the flow of the exhaust gas in the catalyst device is biased, and an occurrence cycle of the lean failure and the rich failure is shortened. When the lean failure occurs, an NOx emission amount of the catalyst device is transitorily increased, and when the rich failure occurs, a THC emission amount of the catalyst device is transitorily increased. Therefore, when the occurrence cycle of the rich failure and the lean failure is shortened, the NOx emission amount and the THC emission amount of the catalyst device are increased.

On the other hand, in a case where the target air-fuel ratio is corrected to the rich side air-fuel ratio, the NOx emission amount of the catalyst device when the lean failure occurs is decreased, while the THC emission amount of the catalyst device when the rich failure occurs is increased. The increase in the THC emission amount at this time is smaller than the decrease in the NOx emission amount. Therefore, in a case where the target air-fuel ratio is corrected to the rich side when the occurrence cycle of the rich failure and the lean failure is shortened, a deterioration in the emission of the engine due to the shortening of the occurrence cycle can be suppressed. Therefore, in a case where, when the opening degree of the wastegate valve is large, the target air-fuel ratio is corrected to be the air-fuel ratio on the rich side with respect to the air-fuel ratio when the opening degree is small, the deterioration in the emission of the engine due to the influence of the opening degree of the wastegate valve can be suppressed.

In the engine control device according to the aspect, the catalyst air-fuel ratio correction process may be performed on a condition that a control of the opening degree of the wastegate valve is not able to be normally performed. Even when the control of the opening degree of the wastegate valve is able to be normally performed, it is desirable to correct the target air-fuel ratio in response to the engine speed and the engine load factor.

Note that the engine control device according to the aspect, the catalyst air-fuel ratio correction process may be performed by setting a correction amount of the target air-fuel ratio based on an engine speed, an engine load factor, and a supercharging pressure. The supercharging pressure in a state where the engine speed and engine load factor are fixed is higher as the opening degree of the wastegate valve is smaller. Therefore, by setting the correction amount based on the engine speed, the engine load factor, and the supercharging pressure, the target air-fuel ratio that reflects the opening degree of the wastegate valve can be corrected.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

First Embodiment

Hereinafter, a first embodiment of an engine control device will be described in detail with reference to FIGS. 1 to 12. The engine control device according to the present embodiment is applied to an engine equipped with a turbocharger mounted on a vehicle.

Configuration of Engine Control Device

Figure 1:
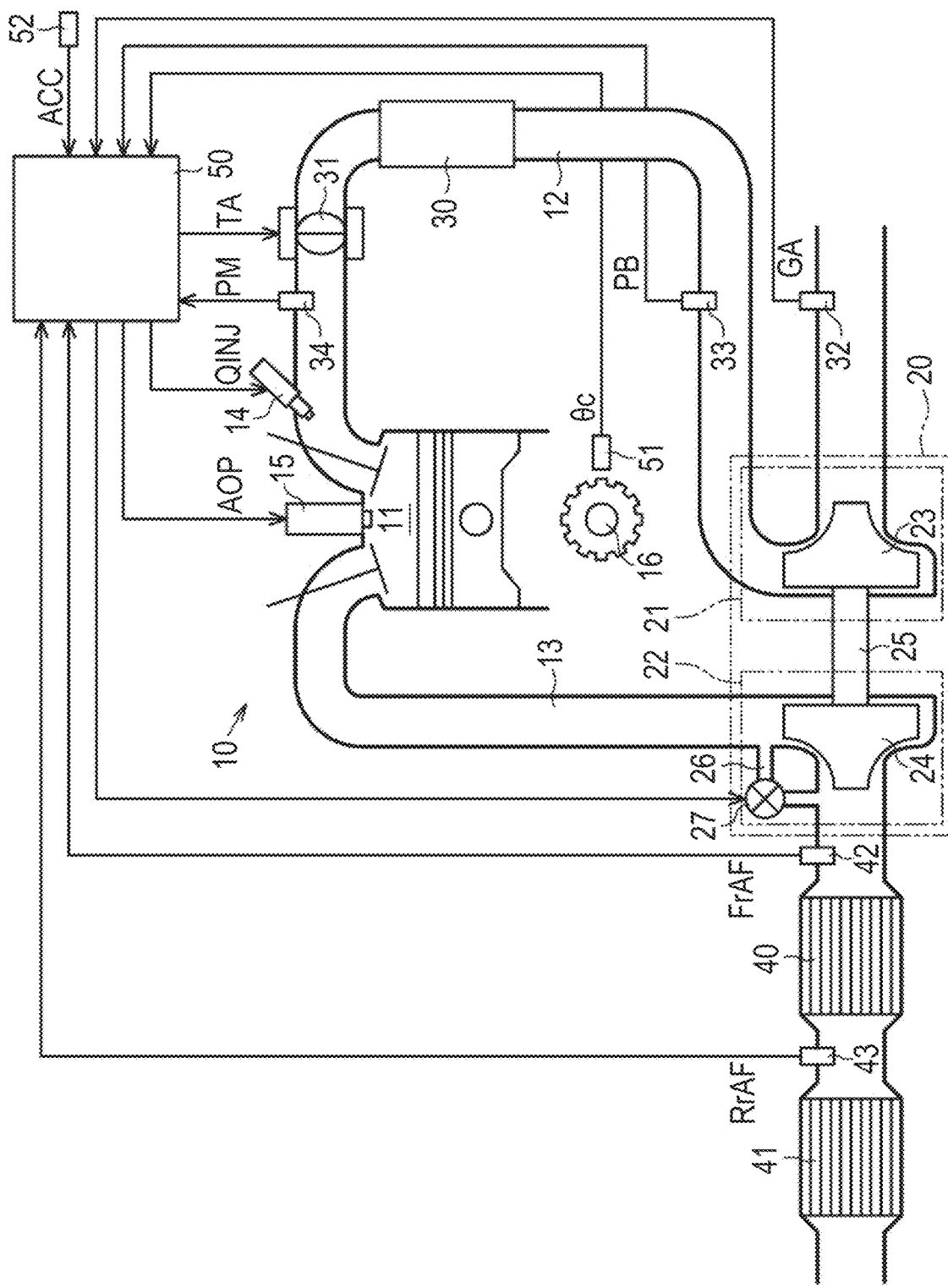
FIG. 1 is a schematic diagram of a configuration of an engine control device according to a first embodiment.

First, a configuration of an engine 10 to which the engine control device according to the present embodiment is applied will be described with reference to FIG. 1. The engine 10 includes a combustion chamber 11 in which an air-fuel mixture is combusted. Further, the engine 10 includes an intake passage 12 that is an introduction passage of an intake gas into the combustion chamber 11 and an exhaust passage 13 that is an emission passage of an exhaust gas from the combustion chamber 11. Note that the engine 10 includes a plurality of cylinders, and each cylinder has the individual combustion chamber 11. FIG. 1 shows solely one of a plurality of the combustion chambers 11. The engine 10 is provided with an injector 14 that injects a fuel in the intake gas to be used for the combustion in the combustion chamber 11, for each cylinder. Further, an ignition device 15 that ignites the air-fuel mixture in the combustion chamber 11 by spark discharge is provided in each cylinder of the engine 10. Moreover, the engine 10 generates a driving force for a vehicle by causing a crankshaft 16 to rotate by the combustion of the air-fuel mixture in the combustion chamber 11.

The engine 10 includes a turbocharger 20. The turbocharger 20 includes a compressor 21 installed in the intake passage 12 and a turbine 22 installed in the exhaust passage 13. The compressor 21 is provided with a compressor wheel 23 that compresses the intake gas in response to the rotation. The turbine 22 is provided with a turbine wheel 24 that rotates in response to a flow of the exhaust gas. The turbine wheel 24 is connected to the compressor wheel 23 via a turbine shaft 25. As a result, when the turbine wheel 24 rotates, the compressor wheel 23 also rotates in conjunction with the rotation of the turbine wheel 24. In addition, the turbine 22 is provided with a bypass passage 26 and a wastegate valve 27. The bypass passage 26 is a flow passage of the exhaust gas that bypasses the turbine wheel 24. The wastegate valve 27 is a valve for changing a flow passage area of the exhaust gas of the bypass passage 26. Note that in the present embodiment, as the wastegate valve 27, a diaphragm type valve that uses a differential pressure between a supercharging pressure PB and an atmospheric pressure as a power for changing the opening degree is adopted.

An intercooler 30 is provided on a downstream side portion of the compressor 21 in the intake passage 12. In addition, a throttle valve 31 is provided on a downstream side portion of the intercooler 30 in the intake passage 12. The intercooler 30 is a cooler that cools the intake gas that has a high temperature due to adiabatic compression by the compressor 21 by exchanging heat with a coolant of the engine 10. In addition, the throttle valve 31 is a valve for changing a flow passage area of the intake gas in the intake passage 12. Further, an air flow meter 32, a supercharging pressure sensor 33, and an intake manifold pressure sensor 34 are installed in the intake passage 12. The air flow meter 32 is installed on an upstream side portion of the compressor 21 in the intake passage 12. Moreover, the air flow meter 32 detects an intake flow rate GA that is a flow rate of the intake gas flowing through the intake passage 12. The supercharging pressure sensor 33 detects a pressure of the intake gas in the intake passage 12 on the downstream side of the intercooler 30 and on an upstream side portion of the throttle valve 31 as the supercharging pressure PB. The intake manifold pressure sensor 34 detects the pressure of the intake gas on the downstream side portion of the throttle valve 31 in the intake passage 12 as an intake manifold pressure PM.

A first catalyst device 40 is installed on a downstream side portion of the turbine 22 in the exhaust passage 13. Further, a second catalyst device 41 is installed on a downstream side portion of the first catalyst device 40 in the exhaust passage 13. A three-way catalyst made of a precious metal, such as platinum, is supported on the first catalyst device 40. The three-way catalyst is a catalytic substance that simultaneously promotes the oxidation of hydrocarbon (HC) and carbon monoxide (CO) that are unburned fuel components in the exhaust gas, and the reduction of nitrogen oxide (NOx) in the exhaust gas. In addition, an oxygen storage agent made of metal oxide, such as ceria, is also supported on the first catalyst device 40. The oxygen storage agent stores the surrounding oxygen in an oxidizing atmosphere with excess oxygen, and releases rapidly increased oxygen in a reducing atmosphere with insufficient oxygen. The first catalyst device 40 on which such an oxygen storage agent is supported is a catalyst device that has an oxygen storage capacity. Similar to the first catalyst device 40, the second catalyst device 41 is also a catalyst device on which a three-way catalyst is supported and has the oxygen storage capacity.

Further, in the exhaust passage 13, a front air-fuel ratio sensor 42 and a rear air-fuel ratio sensor 43 are installed. The front air-fuel ratio sensor 42 is installed on the downstream side portion of the turbine 22 and on an upstream side portion of the first catalyst device 40 in the exhaust passage 13. In addition, the rear air-fuel ratio sensor 43 is installed on the downstream side portion of the first catalyst device 40 and on an upstream side portion of the second catalyst device 41 in the exhaust passage 13. The front air-fuel ratio sensor 42 has a detection unit exposed to the exhaust gas, and outputs an electric signal in response to a composition of the exhaust gas that hits the detection unit. An output of the front air-fuel ratio sensor 42 corresponds to the air-fuel ratio of the air-fuel mixture combusted in the combustion chamber 11. In the following description, the air-fuel ratio indicated by the output of the front air-fuel ratio sensor 42 will be referred to as a front air-fuel ratio FrAF.

On the other hand, the rear air-fuel ratio sensor 43 is also a sensor having the same structure as the front air-fuel ratio sensor 42. Note that the exhaust gas to which a detection unit of the rear air-fuel ratio sensor 43 is exposed is the exhaust gas that has passed through the first catalyst device 40. Therefore, the air-fuel ratio indicated by an output of the rear air-fuel ratio sensor 43 is a value corresponding to a component of the exhaust gas modified in the first catalyst device 40. In the following description, the air-fuel ratio indicated by the output of the rear air-fuel ratio sensor 43 will be referred to as a rear air-fuel ratio RrAF.

An engine control device 50 is mounted on the vehicle on which the engine 10 is mounted. The engine control device 50 is an electronic control unit including an arithmetic processing circuit that performs various processes relating to an engine control and a storage device that stores a program and data for the engine control.

The outputs of the air flow meter 32, the supercharging pressure sensor 33, the intake manifold pressure sensor 34, the front air-fuel ratio sensor 42, and the rear air-fuel ratio sensor 43 are input to the engine control device 50. In addition, an output of a crank angle sensor 51 that detects a crank angle θc that is a rotation angle of the crankshaft 16 of the engine 10 and an output of an accelerator pedal sensor 52 that detects an accelerator pedal operation amount ACC that is a depression amount of an accelerator pedal by a driver are input to the engine control device 50. Note that the engine control device 50 obtains an engine speed NE from the output of the crank angle sensor 51. In addition, the engine control device 50 obtains an engine load factor KL from an intake flow rate GA, the supercharging pressure PB, the intake manifold pressure PM, a throttle opening degree TA, and the like. The engine load factor KL indicates a filling efficiency ηc of the intake gas in the combustion chamber 11.

Moreover, the engine control device 50 performs controls of the throttle opening degree TA, a fuel injection amount QINJ, ignition timing AOP, and the like based on results of the detection of the above sensors. The engine control device 50 also performs a control of a WGV opening degree that is an opening degree of the wastegate valve 27. The control of the WGV opening degree is performed in the aspects as follows. In a case of controlling the WGV opening degree, the engine control device 50 first calculates a requested supercharging pressure PB* that is a requested value of the supercharging pressure PB based on the engine speed NE and the accelerator pedal operation amount ACC. Moreover, the engine control device 50 performs a feedback control of the WGV opening degree such that the supercharging pressure PB reaches the requested supercharging pressure PB*. Further, the engine control device 50 performs a control of the air-fuel ratio of the air-fuel mixture combusted in the combustion chamber 11.

Air-Fuel Ratio Control

Figure 2:
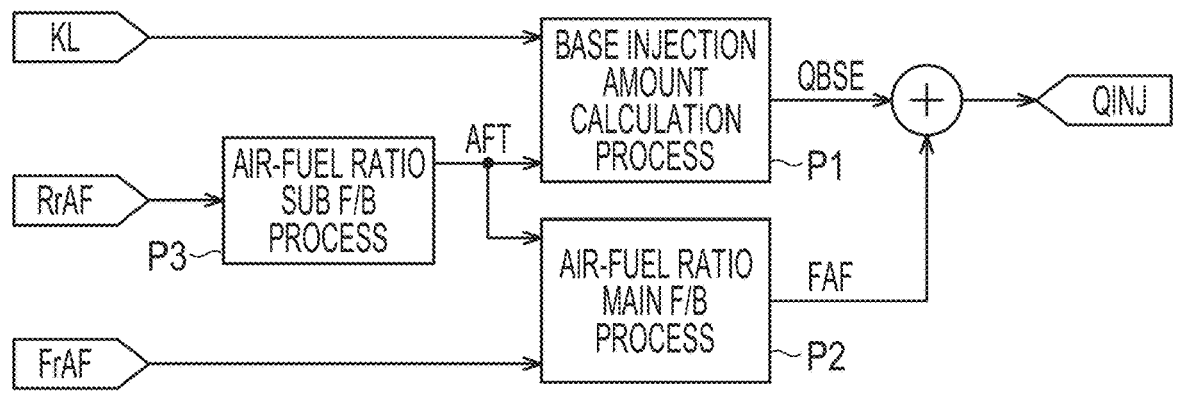
FIG. 2 is a control block diagram of an air-fuel ratio control performed by the engine control device.

Subsequently, an air-fuel ratio control will be described with reference to FIG. 2. FIG. 2 shows a flow of a process of the engine control device 50 relating to the air-fuel ratio control. As shown in FIG. 2, the engine control device 50 performs the air-fuel ratio control by setting the fuel injection amount QINJ of the injector 14 through a base injection amount calculation process P1, an air-fuel ratio main feedback process P2, and an air-fuel ratio sub feedback process P3. Note that in the following description and drawings, the feedback is abbreviated as "F/B".

In the base injection amount calculation process P1, a value of a base injection amount QBSE is calculated based on a target air-fuel ratio AFT that is a target value of the air-fuel ratio and the engine load factor KL. Specifically, in the base injection amount calculation process P1, the quotient (=KL×ρ/AFT) obtained by dividing the product of a density ρ of the intake gas and the engine load factor KL by the target air-fuel ratio AFT is calculated as the value of the base injection amount QBSE.

In the air-fuel ratio main F/B process P2, an air-fuel ratio feedback correction value FAF that is a correction value of the fuel injection amount QINJ is calculated based on the front air-fuel ratio FrAF and the target air-fuel ratio AFT. Specifically, in the air-fuel ratio main F/B process P2, a value of the air-fuel ratio feedback correction value FAF is gradually updated toward a side in which the deviation between the front air-fuel ratio FrAF and the target air-fuel ratio AFT reaches "zero". Note that in the air-fuel ratio control, the product (=QBSE×FAF) obtained by multiplying the base injection amount QBSE by the air-fuel ratio feedback correction value FAF is set as a value of the fuel injection amount QINJ of the injector 14.

Figure 3:
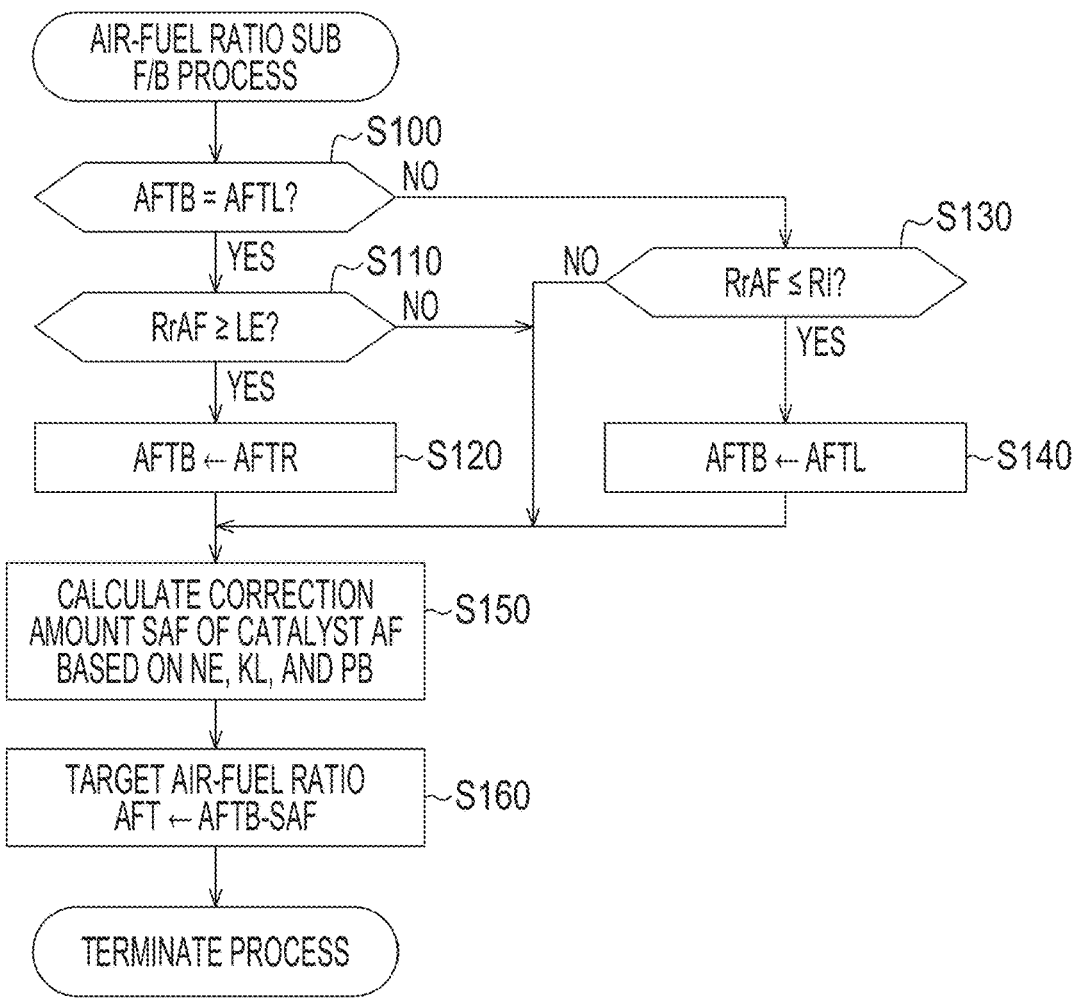
FIG. 3 is a flowchart of an air-fuel ratio sub F/B process performed by the engine control device.

In the air-fuel ratio sub F/B process P3, the target air-fuel ratio AFT is set based on the rear air-fuel ratio RrAF. FIG. 3 shows a flowchart of such an air-fuel ratio sub F/B process P3.

As shown in FIG. 3, in the air-fuel ratio sub F/B process P3, the engine control device 50 first determines whether or not a lean side target air-fuel ratio AFTL is set as a value of a base target air-fuel ratio AFTB, in step S100. As will be described below, as the value of the base target air-fuel ratio AFTB, any one of two values of a rich side target air-fuel ratio AFTR and the lean side target air-fuel ratio AFTL is set. The rich side air-fuel ratio with respect to the stoichiometric air-fuel ratio is preset in a value of the rich side target air-fuel ratio AFTR. The air-fuel ratio on the lean side with respect to the stoichiometric air-fuel ratio is set in a value of the lean side target air-fuel ratio AFTL. Moreover, in a case where the lean side target air-fuel ratio AFTL is set as a value of the current base target air-fuel ratio AFTB (YES), the process proceeds to step S110. On the other hand, in a case where the rich side target air-fuel ratio AFTR is set as the value of the current base target air-fuel ratio AFTB (NO), the process proceeds to step S130.

When the process proceeds to step S110, the engine control device 50 determines whether or not the rear air-fuel ratio RrAF is the air-fuel ratio on the lean side with respect to a lean failure determination value LE, in step S110. In the lean failure determination value LE, the air-fuel ratio on the lean side with respect to the stoichiometric air-fuel ratio is preset as a value. Moreover, in a case where a positive determination is made in step S110 (YES), the rich side target air-fuel ratio AFTR is set as the value of the base target air-fuel ratio AFTB in step S120, and then the process proceeds to step S150. On the other hand, in a case where a negative determination is made in step S110 (NO), the process proceeds to step S150 as it is. In this case, the value of the base target air-fuel ratio AFTB is maintained at the lean side target air-fuel ratio AFTL.

On the other hand, in a case where the process proceeds to step S130, the engine control device 50 determines whether or not the rear air-fuel ratio RrAF is the rich side air-fuel ratio with respect to a rich failure determination value RI, in step S130. In the rich failure determination value RI, the rich side air-fuel ratio with respect to the stoichiometric air-fuel ratio is preset as a value. Moreover, in a case where a positive determination is made in step S130 (YES), the lean side target air-fuel ratio AFTL is set as the value of the base target air-fuel ratio AFTB in step S140, and then the process proceeds to step S150. On the other hand, in a case where a negative determination is made in step S130 (NO), the process proceeds to step S150 as it is. In this case, the value of the base target air-fuel ratio AFTB is maintained at the rich side target air-fuel ratio AFTR.

When the process proceeds to step S150, a correction amount SAF of a catalyst AF is calculated in step S150. A value of the correction amount SAF of the catalyst AF is calculated based on the engine speed NE, the engine load factor KL, and the supercharging pressure PB. The engine control device 50 calculates the correction amount SAF of the catalyst AF using a calculation map stored in advance in the storage device. In the present embodiment, a range of the value that the supercharging pressure PB can take for an operation of the engine 10 is divided into a plurality of sections. Moreover, the calculation map of the correction amount SAF of the catalyst AF corresponding to each of the sections is prepared. In each calculation map, the value of the correction amount SAF of the catalyst AF at each of operation points of the engine 10 predetermined by the engine speed NE and the engine load factor KL is stored. In step S150, the engine control device 50 refers to the calculation map of the section corresponding to the current supercharging pressure PB and acquires the value of the correction amount SAF of the catalyst AF corresponding to the current engine speed NE and engine load factor KL in the calculation map to calculate the correction amount SAF of the catalyst AF.

Figure 4:
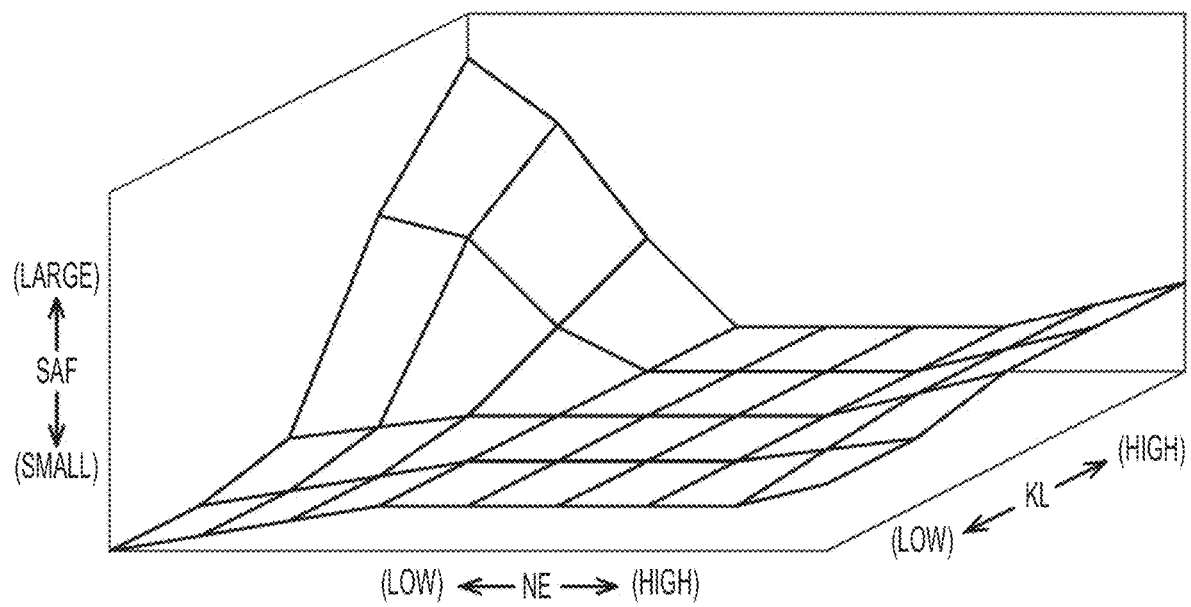
FIG. 4 is a graph showing a relationship between an engine speed, an engine load factor, and a correction amount of a catalyst AF in a calculation map of a section having the highest supercharging pressure.
Figure 5:
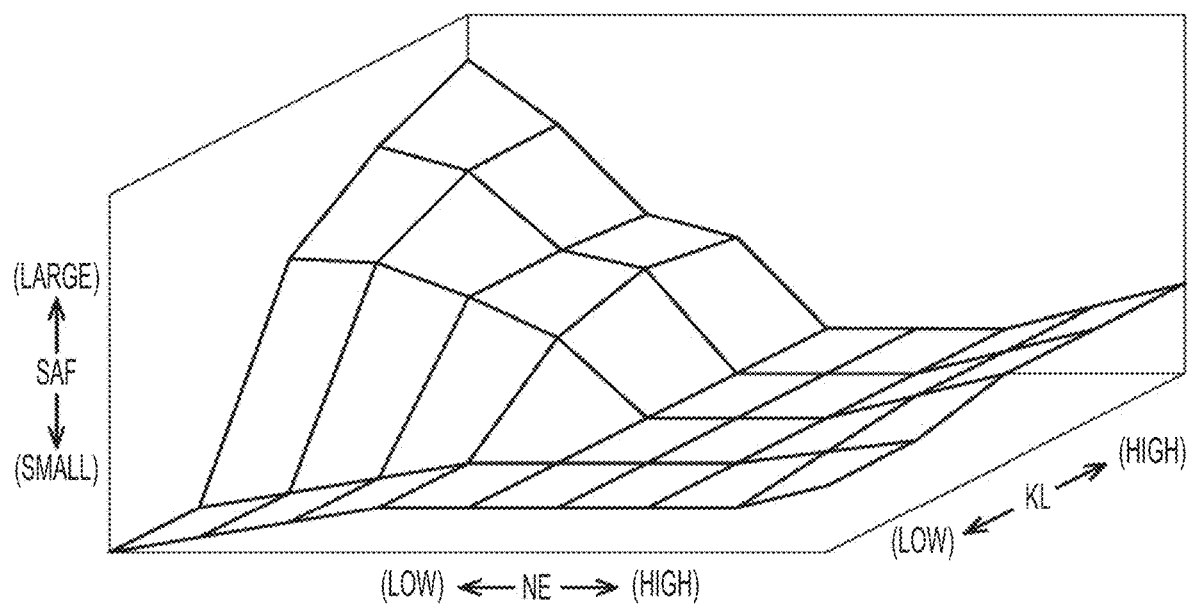
FIG. 5 is a graph showing the relationship between the engine speed, the engine load factor, and the correction amount of the catalyst AF in the calculation map of a section having the lowest supercharging pressure.

FIG. 4 shows a relationship between the engine speed NE, the engine load factor KL, and the value of the correction amount SAF of the catalyst AF in the calculation map corresponding to the section having the highest supercharging pressure PB among the sections. In addition, FIG. 5 shows a relationship between the engine speed NE, the engine load factor KL, and the value of the correction amount SAF of the catalyst AF in the calculation map corresponding to the section having the lowest supercharging pressure PB among the sections. The calculation map of each section is set as follows. That is, in the calculation map of any section, in the region in which the engine speed NE is low and the engine load factor KL is high, a large value as compared to that in the other regions is set as the value of the correction amount SAF of the catalyst AF. In a case where any two calculation maps are selected from the calculation maps of the sections and compared, all the combinations of the calculation maps are as follows. That is, in the calculation map corresponding to the section having the low supercharging pressure PB, a region in which a large value as compared to that of the calculation map corresponding to the section having the high supercharging pressure PB is set as the value of the correction amount SAF of the catalyst AF is widened to a high rotation side and a high load side.

After the correction amount SAF of the catalyst AF is calculated, the process proceeds to step S160. Moreover, in step S160, a difference obtained by subtracting the value of the correction amount SAF of the catalyst AF from the base target air-fuel ratio AFTB is calculated as the value of the target air-fuel ratio AFT. Therefore, when the base target air-fuel ratio AFTB has the same value, the rich side air-fuel ratio is set as the value of the target air-fuel ratio AFT as the value of the correction amount SAF of the catalyst AF is increased. Note that in the present embodiment, steps S150 and S160 in FIG. 3 are processes corresponding to a catalyst air-fuel ratio correction process.

Operations and Effects of Embodiment

Figure 6:
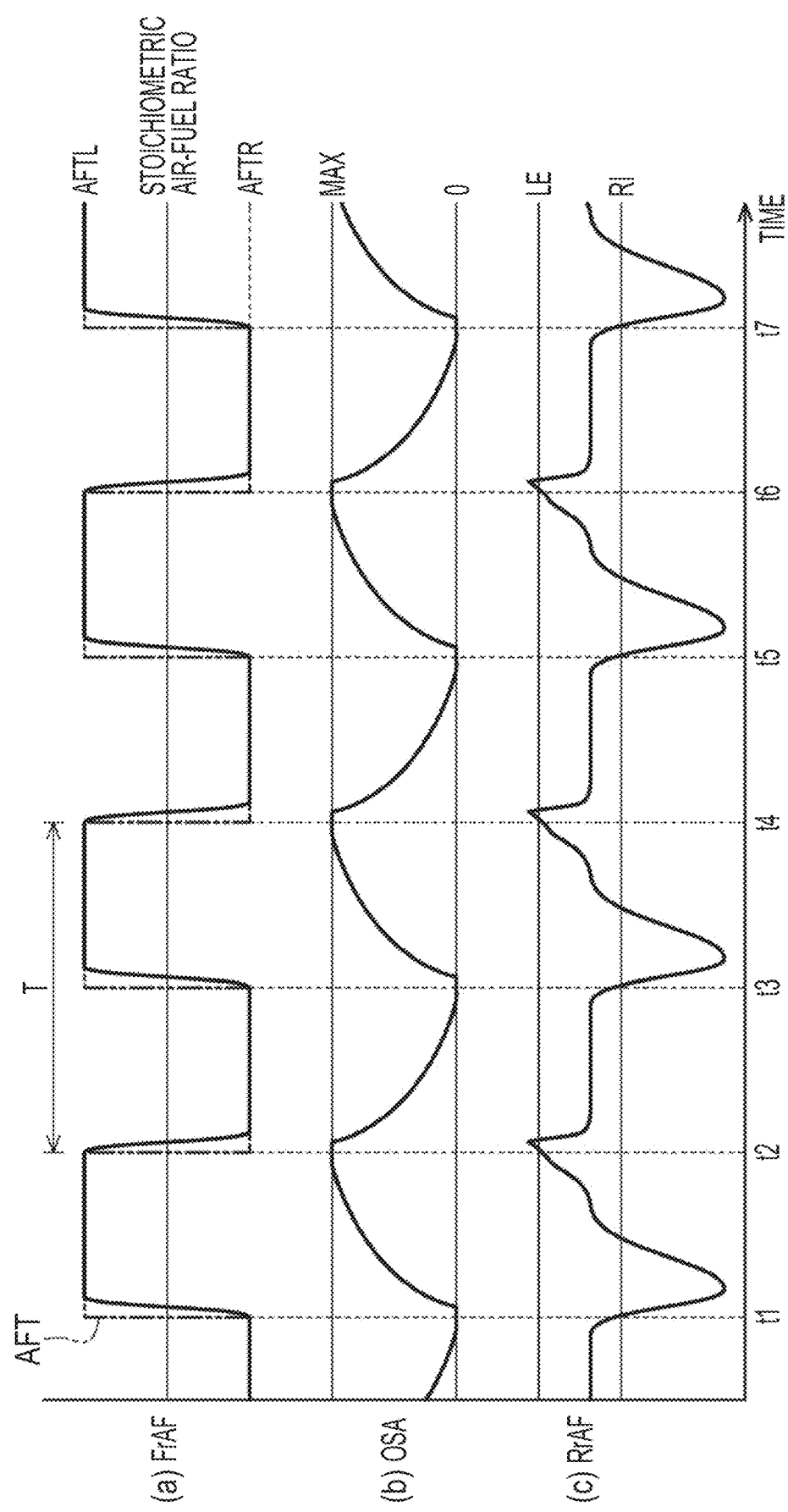
FIG. 6 is a time chart showing transitions of a front air-fuel ratio and a target air-fuel ratio, a transition of oxygen storage amount, and a transition of a rear air-fuel ratio, during the air-fuel ratio control when a WGV is fully closed.

FIG. 6 shows an example of an embodiment of the air-fuel ratio control by the engine control device 50 according to the present embodiment. Note that FIG. 6 shows a situation where the engine 10 is in a steady operation in a state where the wastegate valve 27 is fully closed. Note that a portion (a) of FIG. 6 shows transitions of the front air-fuel ratio FrAF and the target air-fuel ratio AFT, a portion (b) of FIG. 6 shows a transition of an oxygen storage amount OSA of the first catalyst device 40, and a portion (c) of FIG. 6 shows a transition of the rear air-fuel ratio RrAF, respectively. Incidentally, in FIG. 6 and the following description, for the sake of simplicity, the value of the correction amount SAF of the catalyst AF is assumed to be "zero", that is, the base target air-fuel ratio AFTB is assumed to be set as the value of the target air-fuel ratio AFT as it is.

When the lean side target air-fuel ratio AFTL is set as the value of the target air-fuel ratio AFT, the combustion of the air-fuel mixture in the combustion chamber 11 is performed at the air-fuel ratio on the lean side with respect to the stoichiometric air-fuel ratio. In the following description, the combustion of the air-fuel mixture at the stoichiometric air-fuel ratio will be referred to as stoichiometric combustion, the combustion of the air-fuel mixture at the lean side air-fuel ratio with respect to the stoichiometric air-fuel ratio will be referred to as lean combustion, and the combustion of the air-fuel mixture at the rich side air-fuel ratio with respect to the stoichiometric air-fuel ratio will be referred to as rich combustion. In addition, in the following description, the exhaust gas containing an amount of oxygen equal to the amount requested for complete combustion of the unburned fuel components in the exhaust gas will be referred to as a stoichiometric exhaust gas. Further, in the following description, the exhaust gas containing an amount of oxygen larger than the amount requested for the complete combustion of the unburned fuel components in the exhaust gas will be referred to as a lean exhaust gas. In addition, in the following description, the exhaust gas containing an amount of oxygen less than the amount requested for the complete combustion of the unburned fuel components in the exhaust gas will be referred to as a rich exhaust gas. The exhaust gas generated by the stoichiometric combustion is the stoichiometric exhaust gas, the exhaust gas generated by the lean combustion is the lean exhaust gas, and the exhaust gas generated by the rich combustion is the rich exhaust gas.

During the lean combustion, the lean exhaust gas flows into the first catalyst device 40. The first catalyst device 40 at this time stores excess oxygen in the exhaust gas to reduce NOx in the exhaust gas. As a result, the exhaust gas flowing out from the first catalyst device 40 has a composition similar to that of the stoichiometric exhaust gas. Therefore, the rear air-fuel ratio RrAF at this time is a value near the stoichiometric air-fuel ratio.

Note that there is an upper limit to the amount of oxygen that can be stored by the first catalyst device 40. Therefore, when the lean combustion continues, the oxygen storage amount OSA of the first catalyst device 40 eventually reaches an upper limit value MAX thereof, and the oxygen cannot be stored anymore. Moreover, the lean exhaust gas flows out from the first catalyst device 40. In the following description, a state where the lean exhaust gas flows out from the first catalyst device 40 as described above will be referred to as a lean failure state. When the lean failure occurs, the exhaust gas flowing around the detection unit of the rear air-fuel ratio sensor 43 is the lean exhaust gas. Therefore, the rear air-fuel ratio RrAF at this time is the air-fuel ratio on the lean side with respect to the stoichiometric air-fuel ratio.

The engine control device 50 confirms the occurrence of the lean failure by setting the rear air-fuel ratio RrAF to the value on the lean side with respect to the lean failure determination value LE during the lean combustion. Moreover, when the occurrence of the lean failure is confirmed, the engine control device 50 switches the target air-fuel ratio AFT from the lean side target air-fuel ratio AFTL to the rich side target air-fuel ratio AFTR. As a result, the combustion in the combustion chamber 11 is switched from the lean combustion to the rich combustion. In FIG. 6, at times t2, t4, t6, switching from the lean combustion to the rich combustion is performed in response to the lean failure.

When the rich combustion is started, the rich exhaust gas flows into the first catalyst device 40. The first catalyst device 40 at this time oxidatively cleans the unburned fuel components in the exhaust gas by releasing the oxygen stored during the lean combustion. As a result, the exhaust gas flowing out from the first catalyst device 40 has a composition similar to that of the stoichiometric exhaust gas. Therefore, the rear air-fuel ratio RrAF is the value near the stoichiometric air-fuel ratio again.

When the rich combustion continues, the oxygen storage amount OSA of the first catalyst device 40 is eventually "zero", and the unburned fuel components cannot be sufficiently oxidized. As a result, the rich exhaust gas flows out from the first catalyst device 40, and the rear air-fuel ratio RrAF is changed from the value near the stoichiometric air-fuel ratio to a value on the rich side. In the following description, a state where the rich exhaust gas flows out from the first catalyst device 40 as described above will be referred to as a rich failure state.

The engine control device 50 confirms the occurrence of the rich failure by setting the rear air-fuel ratio RrAF to the value on the rich side with respect to the rich failure determination value RI during the rich combustion. Moreover, when the occurrence of the rich failure is confirmed, the engine control device 50 switches the target air-fuel ratio AFT from the rich side target air-fuel ratio AFTR to the lean side target air-fuel ratio AFTL and starts the lean combustion. Thereafter the lean combustion and the rich combustion are alternately switched for each time the occurrence of the lean failure and the rich failure is confirmed. Note that in FIG. 6, at times t1, t3, t5, t7, switching from the rich combustion to the lean combustion is performed in response to the rich failure.

Note that when the lean failure occurs, an NOx emission amount from the first catalyst device 40 is transitorily increased. In addition, when the rich failure occurs, a THC emission amount from the first catalyst device 40 is transitorily increased. The THC emission amount is the sum of a methane emission amount and a non-methane hydrocarbon emission amount. Incidentally, the second catalyst device 41 plays a role of cleaning CO, HC, and NOx that have not been completely cleaned by the first catalyst device 40.

As described above, the engine control device 50 performs the air-fuel ratio control through the two feedback processes of the air-fuel ratio main F/B process P2 based on the output of the front air-fuel ratio sensor 42 and the air-fuel ratio sub F/B process P3 based on the output of the rear air-fuel ratio sensor 43. Moreover, the exhaust performance of the engine 10 is ensured by such an air-fuel ratio control.

On the other hand, in the engine 10, the first catalyst device 40 is installed on the downstream side portion of the turbine 22 in the exhaust passage 13. Moreover, the turbine 22 is provided with the bypass passage 26 that bypasses the turbine wheel 24 and allows the exhaust gas to flow, and the wastegate valve 27 for changing the flow passage area of the exhaust gas in the bypass passage 26. In such an engine 10, the way the exhaust gas hits the first catalyst device 40 is changed depending on the opening degree of the wastegate valve 27. Moreover, due to the change, the emission of the engine 10 may be deteriorated.

Figure 7:
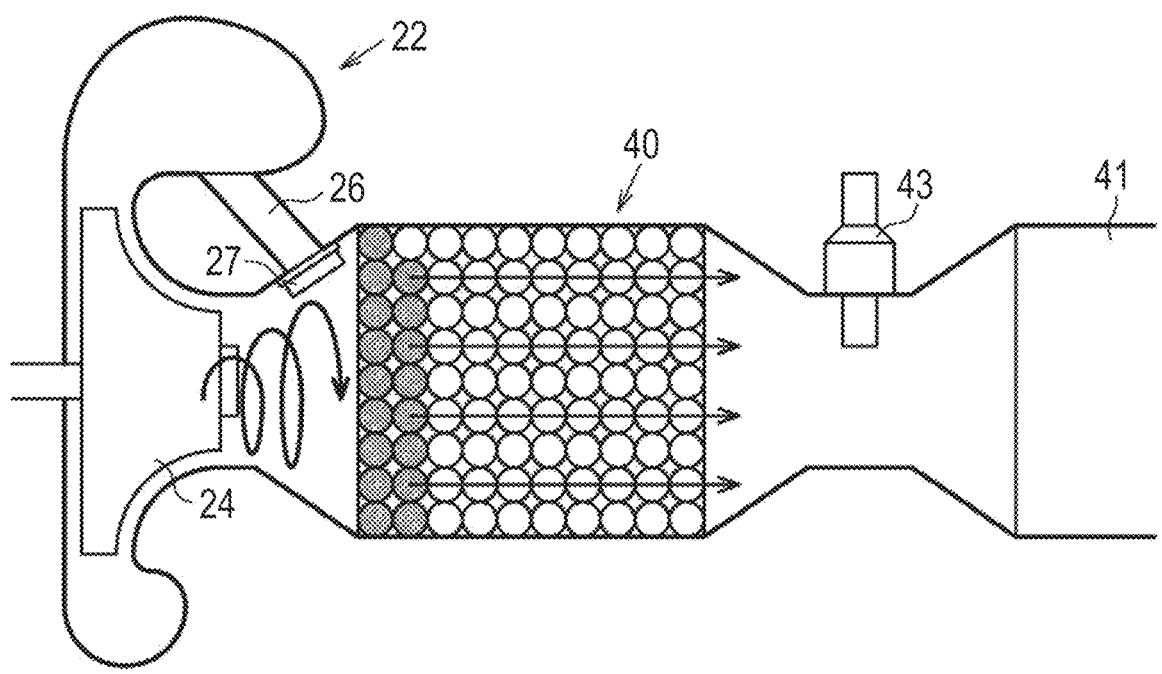
FIG. 7 is a diagram showing a flow of an exhaust gas of a front catalyst device and an oxygen storage state immediately after the start of rich combustion when the WGV is fully closed.

FIG. 7 shows a flow of the exhaust gas flowing into the first catalyst device 40 when the wastegate valve 27 is fully closed. Note that in the following description, an end of the first catalyst device 40 on the upstream side of a flow direction of the exhaust gas will be referred to as a front end of the first catalyst device 40. In addition, an end of the first catalyst device 40 on the downstream side of the flow direction of the exhaust gas will be referred to as a rear end of the first catalyst device 40.

At this time, since the bypass passage 26 is blocked, all the exhaust gases emitted from the combustion chamber 11 reach the first catalyst device 40 via the turbine wheel 24. The flow of the exhaust gas passes through the turbine wheel 24 to be a rotational flow as shown in FIG. 7. Therefore, a bias per exhaust gas on an end surface on a front end side of the first catalyst device 40 at this time is small. That is, the exhaust gas uniformly hits the entire end surface on the front end side of the first catalyst device 40.

Figure 8:
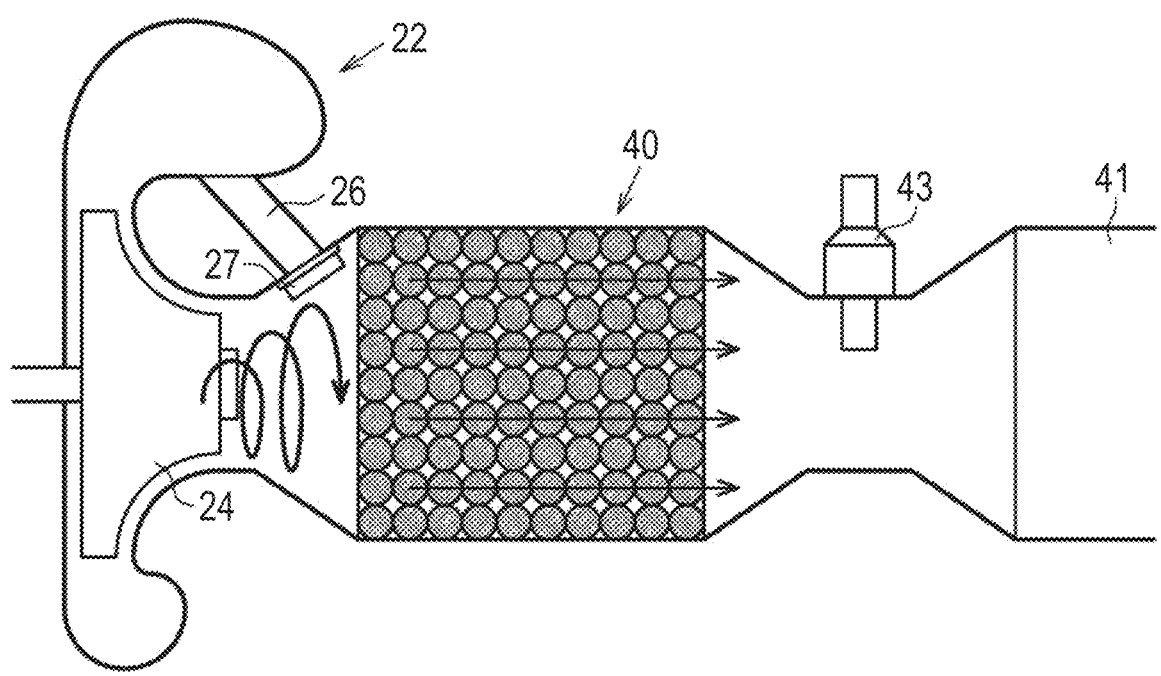
FIG. 8 is a diagram showing the flow of the exhaust gas of the front catalyst device and the oxygen storage state where a rich failure occurs when the WGV is fully closed.

FIGS. 7 and 8 to 10 described below show an oxygen storage state of each part of the first catalyst device 40. The parts indicated by white circles in FIGS. 7 and 8 to 10 indicate the parts in which the oxygen storage agent is in a state of storing the oxygen. In addition, the parts indicated by circles filled with hatching in FIGS. 7 and 8 to 10 indicate parts in which the oxygen storage agent is in a state of releasing the oxygen. FIG. 7 shows the oxygen storage state of the first catalyst device 40 immediately after the combustion is switched from the lean combustion to the rich combustion in response to the occurrence of the lean failure. In addition, FIG. 8 shows the oxygen storage state of the first catalyst device 40 when the rich failure occurs thereafter.

As described above, in a case where the wastegate valve 27 is fully closed, the exhaust gas uniformly hits the entire end surface on the front end side of the first catalyst device 40, so that the release of the oxygen of the oxygen storage agent after the rich combustion is started proceeds evenly from the front end of the first catalyst device 40 to the rear end thereof. Therefore, as shown in FIG. 8, the first catalyst device 40 when the rich failure occurs is in a state where almost all of the oxygen stored during the lean combustion are released, that is, a state where the oxygen storage amount OSA is almost zero. Note that the oxygen storage during the lean combustion proceeds evenly from the front end of the first catalyst device 40 to the rear end thereof, similarly. Therefore, the first catalyst device 40 when the lean failure occurs is in a state where the oxygen is stored to the limit, that is, a state where the oxygen storage amount OSA is the upper limit value MAX.

Figure 9:
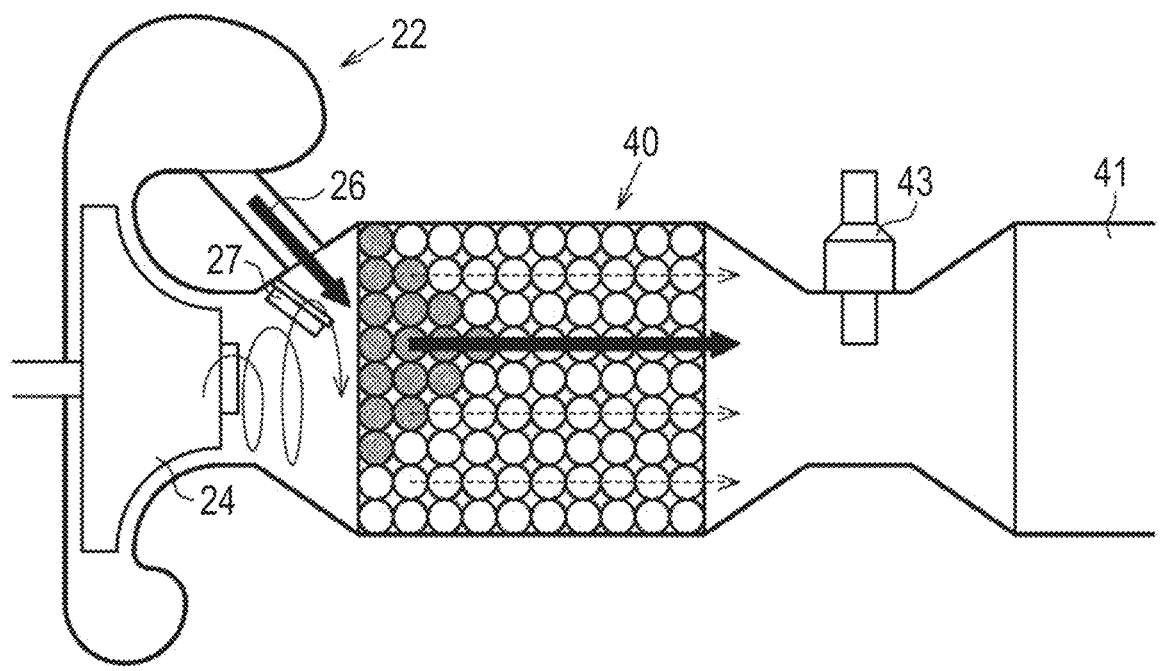
FIG. 9 is a diagram showing the flow of the exhaust gas of the front catalyst device and the oxygen storage state immediately after the start of the rich combustion when the WGV is fully opened.

FIG. 9 shows a flow of the exhaust gas flowing into the first catalyst device 40 when the wastegate valve 27 is fully opened. Since a pressure loss of the exhaust gas in the route passing through the turbine wheel 24 is larger than that of the bypass passage 26, most of the exhaust gas emitted from the combustion chamber 11 at this time reaches the first catalyst device 40 through the bypass passage 26. At this time, as shown in FIG. 9, a strong blowdown flow ejected from the bypass passage 26 hits a limited range of the end surface on the front end side of the first catalyst device 40. Therefore, the first catalyst device 40 at this time is formed with a portion through which a large amount of the exhaust gas flows and a portion through which solely a small amount of the exhaust gas flows.

Figure 10:
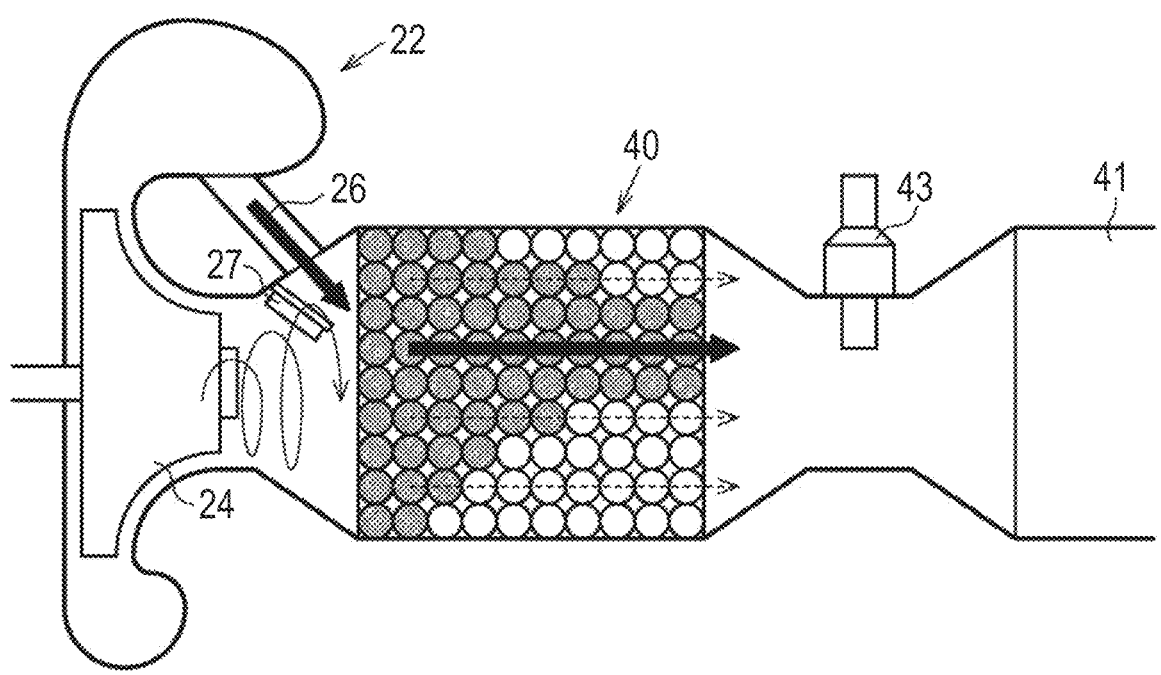
FIG. 10 is a diagram showing the flow of the exhaust gas of the front catalyst device and the oxygen storage state where the rich failure occurs when the WGV is fully opened.

Note that FIG. 9 shows the oxygen storage state of the first catalyst device 40 immediately after the combustion is switched from the lean combustion to the rich combustion in response to the occurrence of the lean failure. In addition, FIG. 10 shows the oxygen storage state of the first catalyst device 40 when the rich failure occurs thereafter. The release of the oxygen in the first catalyst device 40 at this time is concentrated in the portion in which a large amount of the exhaust gas flows. Therefore, at this time, as shown in FIG. 10, the rich failure occurs in a state where a portion that stores the oxygen remains inside the first catalyst device 40.

Figure 11:
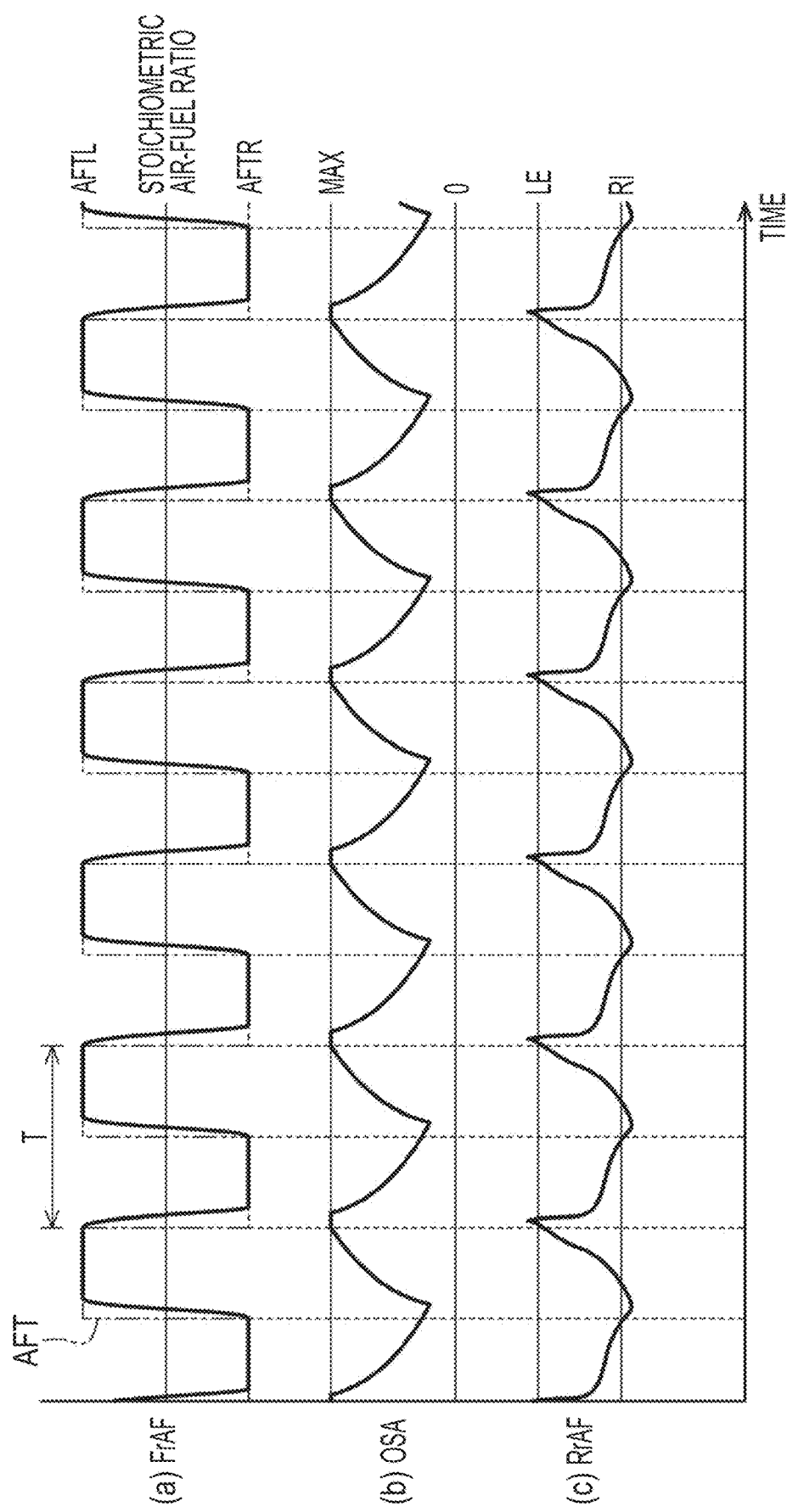
FIG. 11 is a time chart showing transitions of the front air-fuel ratio and the target air-fuel ratio, a transition of the oxygen storage amount, and a transition of the rear air-fuel ratio, during the air-fuel ratio control when the WGV is fully opened.

FIG. 11 shows an example of the embodiment of the air-fuel ratio control when the engine 10 is in the steady operation in a state where the wastegate valve 27 is fully opened. Note that a portion (a) of FIG. 11 shows transitions of the front air-fuel ratio FrAF and the target air-fuel ratio AFT, a portion (b) of FIG. 11 shows a transition of an oxygen storage amount OSA of the first catalyst device 40, and a portion (c) of FIG. 11 shows a transition of the rear air-fuel ratio RrAF, respectively. In FIG. 11 and the following description, "zero" is assumed to be set as the value of the correction amount SAF of the catalyst AF, and the base target air-fuel ratio AFTB is assumed to be set as the value of the target air-fuel ratio AFT as it is.

In this case, the lean failure occurs before the oxygen storage amount OSA of the first catalyst device 40 is reduced to "zero". Therefore, a period of time from when the lean combustion is started to when the lean failure occurs is shorter than that in the case of FIG. 6. In addition, since the rich combustion is started in the state where the oxygen storage amount OSA is not reduced to "zero", the period of time from when the rich combustion is started to when the rich failure occurs is shorter than that in the case of FIG. 6. Therefore, when the wastegate valve 27 is fully opened, an occurrence cycle T of the lean failure and the rich failure is shorter than that of when the wastegate valve 27 is fully closed.

Note that when the flow rate of the exhaust gas emitted from the combustion chamber 11 is the same, the flow rate of the exhaust gas of the bypass passage 26 is larger as the WGV opening degree is larger. That is, the blowdown flow of the exhaust gas from the bypass passage 26 toward the first catalyst device 40 is stronger as the WGV opening degree is larger, so that the bias of the exhaust flow inside the first catalyst device 40 is increased. Therefore, when the WGV opening degree is large, the occurrence cycle T of the lean failure and the rich failure is shorter than that of when the WGV opening degree is small. When the occurrence cycle T is shortened, the frequency of the occurrence of the lean failure and the rich failure is increased. On the other hand, as described above, when the lean failure occurs, the NOx emission amount from the first catalyst device 40 is transitorily increased, and when the rich failure occurs, a THC emission amount from the first catalyst device 40 is transitorily increased. Therefore, when the occurrence cycle T of the lean failure and the rich failure is shortened due to the increase in the WGV opening degree, the emission of the engine 10 may be deteriorated.

Incidentally, it takes a certain amount of time for the exhaust gas emitted from the combustion chamber 11 to reach the first catalyst device 40. Therefore, even when the lean failure occurs and the combustion in the combustion chamber 11 is switched from the lean combustion to the rich combustion, in the period of time until the exhaust gas generated by the rich combustion reaches the first catalyst device 40, the exhaust gas generated by the lean combustion continues to flow into the first catalyst device 40. Moreover, during the above period of time, the NOx emission amount of the first catalyst device 40 continues to be increased. In addition, even when the rich failure occurs and the combustion in the combustion chamber 11 is switched from the rich combustion to the lean combustion, in the period of time until the exhaust gas generated by the lean combustion reaches the first catalyst device 40, the exhaust gas generated by the rich combustion continues to flow into the first catalyst device 40. Moreover, during the above period of time, the emission amounts of CO and HC of the first catalyst device 40 continue to be increased. On the other hand, an arrival time of the exhaust gas from the combustion chamber 11 to the first catalyst device 40 is longer as the engine speed NE is lower. Therefore, the NOx emission amount from the first catalyst device 40 when the lean failure occurs and the THC emission amount from the first catalyst device 40 when the rich failure occurs are larger as the engine speed NE is lower.

In addition, the amount of the exhaust gas emitted from the combustion chamber 11 for each combustion is larger as the engine load factor KL is higher. Therefore, the amount of NOx flowing into the first catalyst device 40 during the lean combustion and the amounts of CO and HC flowing into the first catalyst device 40 during the rich combustion are larger as the engine load factor KL is higher. Therefore, the NOx emission amount of the first catalyst device 40 when the lean failure occurs and the THC emission amount of the first catalyst device 40 when the rich failure occurs are larger as the engine load factor KL is higher.

In view of the above, in a case where the engine speed NE is low and the engine load factor KL is high, the THC emission amount and NOx emission amount of the first catalyst device 40 due to the lean failure and the rich failure are greatly increased. Moreover, under an operation condition in which the engine speed NE is low and the engine load factor KL is high, when the frequency of the occurrence of the lean failure and the rich failure is increased due to the increase in the WGV opening degree, the THC emission amount and the NOx emission amount of the first catalyst device 40 are further increased.

On the other hand, in the engine control device 50 according to the present embodiment, the correction amount SAF of the catalyst AF is calculated based on the engine speed NE, the engine load factor KL, and the supercharging pressure PB. Moreover, the target air-fuel ratio AFT is corrected by the correction amount SAF of the catalyst AF. Incidentally, the target air-fuel ratio AFT is corrected to be the air-fuel ratio on the rich side as the value of the correction amount SAF of the catalyst AF is increased. A large value is set for the correction amount SAF of the catalyst AF when the engine 10 is a low rotation and operated at a high load. Further, when the supercharging pressure PB is low, an operation region of the engine 10 in which a large value is set for the correction amount SAF of the catalyst AF is extended to the high rotation side and the low load side.

Note that during the steady operation of the engine 10 in which the engine speed NE and the engine load factor KL are held to be fixed, the supercharging pressure PB of the engine 10 is a fixed value by the WGV opening degree. That is, the supercharging pressure PB at this time is lower as the WGV opening degree is larger, and is higher as the WGV opening degree is smaller. Therefore, in the operation region of the engine 10 on the low rotation side and the high load side, when the WGV opening degree is large, the target air-fuel ratio AFT is corrected to be the air-fuel ratio on the rich side with respect to the air-fuel ratio when the WGV opening degree is small.

Figure 12:
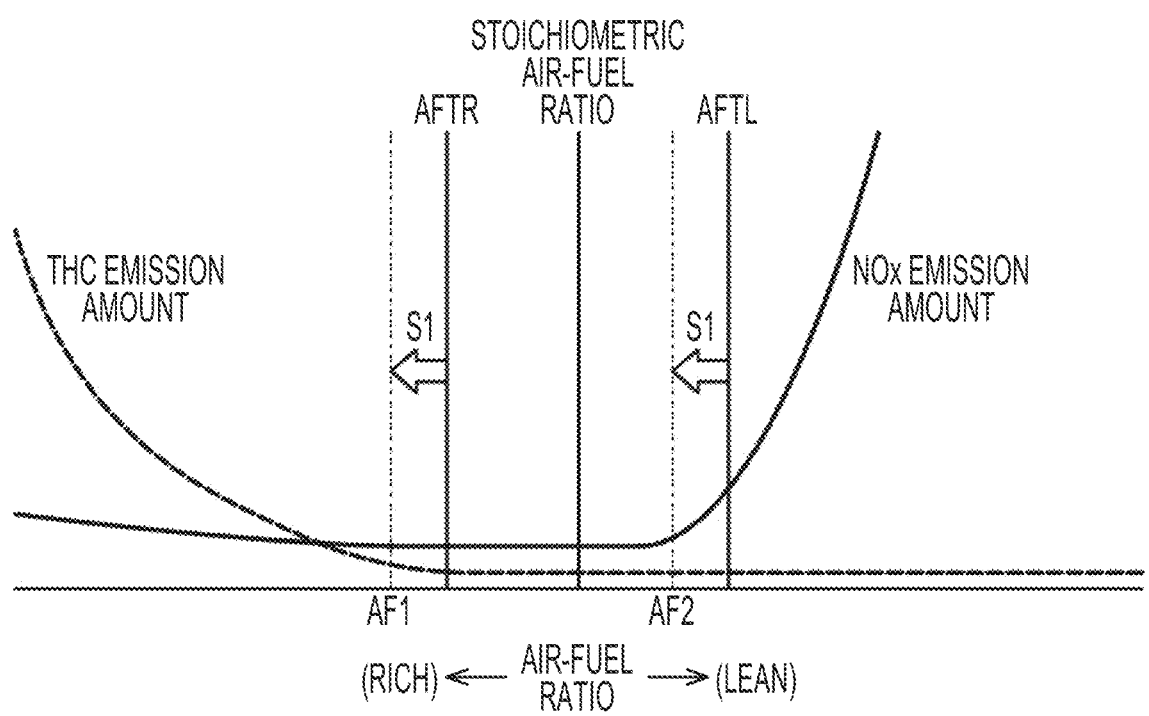
FIG. 12 is a graph showing a relationship between the air-fuel ratio, a THC emission amount, and an NOx emission amount.

FIG. 12 shows a relationship between the air-fuel ratio and the NOx emission amount and the THC emission amount of the first catalyst device 40 when the combustion of the air-fuel mixture in the combustion chamber 11 continues at a fixed air-fuel ratio.

As shown in FIG. 12, at the air-fuel ratio on the rich side with respect to the stoichiometric air-fuel ratio, the NOx emission amount remains very small. Moreover, when the air-fuel ratio is changed from the stoichiometric air-fuel ratio to the rich side, the NOx emission amount is rapidly increased with the change of the air-fuel ratio to the rich side. On the other hand, at the air-fuel ratio on the lean side with respect to the stoichiometric air-fuel ratio, the THC emission amount remains very small. Moreover, when the air-fuel ratio is changed from the stoichiometric air-fuel ratio to the lean side, the THC emission amount is increased with the change. Note that the increase in the THC emission amount with respect to the change of the air-fuel ratio from the stoichiometric air-fuel ratio to the rich side is gentler than the increase in the NOx emission amount with respect to the change of the air-fuel ratio from the stoichiometric air-fuel ratio to the lean side. Incidentally, a change tendency of the CO emission amount of the first catalyst device 40 with respect to the change of the air-fuel ratio is the same as that of the THC emission amount.

In a case where the correction amount SAF of the catalyst AF is "zero", the rich combustion is performed in a state where the target air-fuel ratio AFT is the rich side target air-fuel ratio AFTR. In a case where the combustion continues at the air-fuel ratio on the rich side with respect to the stoichiometric air-fuel ratio, the oxygen storage amount OSA of the first catalyst device 40 is "zero". Therefore, in this case, the THC emission amount of the first catalyst device 40 when the rich failure occurs is the THC emission amount when the air-fuel ratio in FIG. 12 is the rich side target air-fuel ratio AFTR. In addition, in this case, the lean combustion is performed in a state where the target air-fuel ratio AFT is the lean side target air-fuel ratio AFTL. In a case where the combustion continues at the air-fuel ratio on the lean side with respect to the stoichiometric air-fuel ratio, the oxygen storage amount OSA of the first catalyst device 40 reaches the upper limit value MAX. Therefore, in this case, the NOx emission amount of the first catalyst device 40 when the lean failure occurs is the NOx emission amount when the air-fuel ratio in FIG. 12 is the lean side target air-fuel ratio AFTL.

A case where a positive value S1 is set in the correction amount SAF of the catalyst AF and the target air-fuel ratio AFT is corrected to the rich side will be described. In this case, the rich combustion is performed in a state where an air-fuel ratio AF1 on the rich side by an amount of the value S1 with respect to the rich side target air-fuel ratio AFTR, as the target air-fuel ratio AFT. In addition, in this case, the lean combustion is performed at an air-fuel ratio AF2 on the rich side by an amount of the value S1 with respect to the lean side target air-fuel ratio AFTL. Moreover this case, the THC emission amount of the first catalyst device 40 when the rich failure occurs is the THC emission amount of the air-fuel ratio AF1 in FIG. 12. In addition, in this case, the NOx emission amount of the first catalyst device 40 when the lean failure occurs is the NOx emission amount of the air-fuel ratio AF2 in FIG. 12.

As described above, in a case where the target air-fuel ratio AFT is corrected to the rich side, the NOx emission amount when the lean failure occurs is decreased as compared to a case where the target air-fuel ratio AFT is not corrected, while the THC emission amount when the rich failure occurs is increased. Note that the increase in the THC emission amount due to the correction at this time is smaller than the decrease in the NOx emission amount due to the correction. Therefore, by correcting the target air-fuel ratio AFT to the rich side, it is easy to suppress both the NOx emission amount when the lean failure occurs and the THC emission amount when the rich failure occurs within an acceptable range.

With the engine control device 50 according to the present embodiment described above, the following effects can be obtained.

(1) In the present embodiment, when the WGV opening degree is large, the target air-fuel ratio AFT is corrected to be the air-fuel ratio on the rich side with respect to the air-fuel ratio when the WGV opening degree is small. As a result, the deterioration in the emission of the engine 10 due to the increase in the frequency of the occurrence of the lean failure and the rich failure when the WGV opening degree is large can be suppressed.

(2) The correction amount of the target air-fuel ratio AFT to the rich side is increased during the operation of the engine 10 at a low rotation and a high load. As a result, the deterioration in the emission of the engine 10 due to the increase in the THC emission amount when the rich failure occurs and the increase in the NOx emission amount when the lean failure occurs during the operation can be suppressed.

Second Embodiment

Hereinafter, a second embodiment of the engine control device will be described in detail with reference to FIG. 13.

Note that in the present embodiment, the same reference characters are given to the configurations common to the embodiment described above, and detailed description thereof will be omitted. In the present embodiment, a process content of the air-fuel ratio sub F/B process P3 in the first embodiment is changed, and other points are the same as those in the first embodiment.

Figure 13:
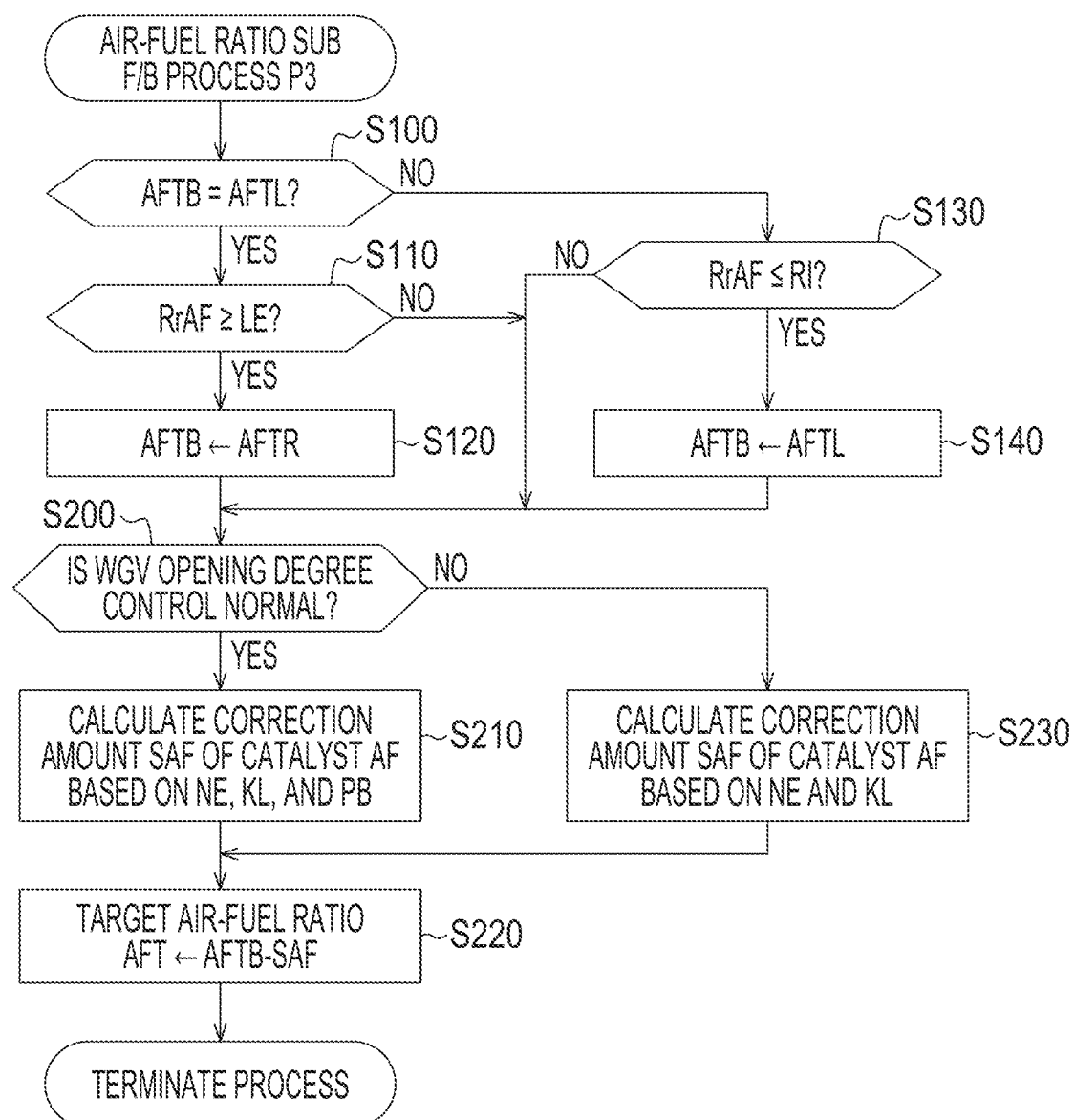
FIG. 13 is a flowchart of the air-fuel ratio sub F/B process performed by the engine control device according to a second embodiment.

FIG. 13 is a flowchart of the air-fuel ratio sub F/B process P3 performed by the engine control device 50 according to the present embodiment. Note that steps S100 to S140 of FIG. 13 are the same as that of the first embodiment shown in FIG. 3. That is, also in the present embodiment, the occurrence of the lean failure and the rich failure is confirmed based on the rear air-fuel ratio RrAF, and the value of the base target air-fuel ratio AFTB is alternately switched between the lean side target air-fuel ratio AFTL and the rich side target air-fuel ratio AFTR in response to the confirmation.

In FIG. 13, when the processes of steps S100 to S140 are completed, the process proceeds to step S200. Then, in step S200, the engine control device 50 determines whether or not the WGV opening degree cannot be normally controlled. The state where the WGV opening degree cannot be normally controlled includes fixing of a valve element of the wastegate valve 27 and malfunctioning of an actuator. The state where the WGV opening degree cannot be normally controlled also includes a state where a changing speed of the WGV opening degree is significantly reduced, as well as a state where the WGV opening degree cannot be changed at all.

In a case where the WGV opening degree cannot be normally controlled (S200: YES), the process proceeds to step S210. Moreover, in step S210, the correction amount SAF of the catalyst AF is set based on the engine speed NE, the engine load factor KL, and the supercharging pressure PB. The correction amount SAF of the catalyst AF here is set in the same manner as in step S150 of FIG. 3. Thereafter, in step S220, the difference obtained by subtracting the value of the correction amount SAF of the catalyst AF from the base target air-fuel ratio AFTB is calculated as the value of the target air-fuel ratio AFT, and then the air-fuel ratio sub F/B process P3 is terminated. The target air-fuel ratio AFT at this time is corrected in response to the WGV opening degree.

On the other hand, in a case where the WGV opening degree cannot be normally controlled (S200: NO), the process proceeds to step S230. Moreover, in step S230, the value of the correction amount SAF of the catalyst AF is set based on the engine speed NE and the engine load factor KL, and then the process proceeds to step S220. The target air-fuel ratio AFT at this time is not corrected in response to the WGV opening degree.

During the steady operation of the engine 10 in which the engine load factor KL matches a requested load factor KL*, when the WGV opening degree is appropriately controlled, the WGV opening degree for each operation point of the engine 10 defined by the engine speed NE and the engine load factor KL is a substantially fixed value. Therefore, in a case where the WGV opening degree is appropriately controlled, the target air-fuel ratio AFT that reflects the WGV opening degree is corrected even based on the engine speed NE and the engine load factor KL without referring to the supercharging pressure PB.

On the other hand, the WGV opening degree at each operation point of the engine 10 deviates significantly from a steady value solely in a case where the WGV opening degree cannot be normally controlled. Therefore, the correction of the target air-fuel ratio AFT by referring to the supercharging pressure PB in addition to the engine speed NE and the engine load factor KL need only be performed in a case where the WGV opening degree cannot be normally controlled. Therefore, also in the present embodiment, the same operations and effects as those in the first embodiment can be obtained.

Third Embodiment

Hereinafter, a third embodiment of the engine control device will be described in detail with reference to FIGS. 14 to 15. Note that in the present embodiment, the same reference characters are given to the configurations common to the embodiment described above, and detailed description thereof will be omitted.

Figure 14:
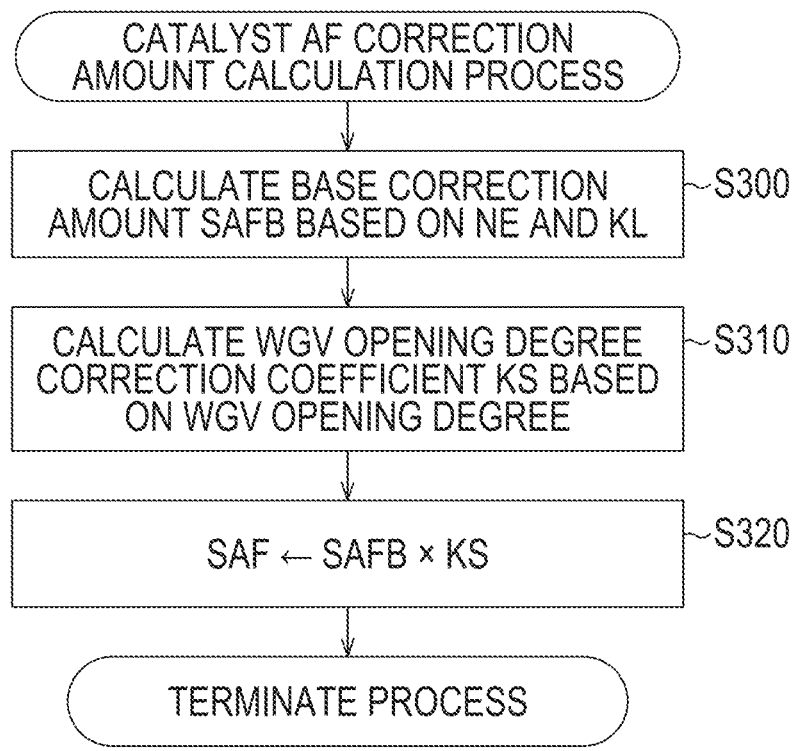
FIG. 14 is a flowchart of a calculation process of the correction amount of the catalyst AF performed by the engine control device according to a third embodiment.

FIG. 14 shows a flowchart of the calculation process of the correction amount SAF of the catalyst AF in the present embodiment. In the present embodiment, the calculation process of FIG. 14 is performed instead of the processes of steps S150 and S160 of FIG. 3.

In the calculation of the correction amount SAF of the catalyst AF in the present embodiment, first, in step S300, a value of a base correction amount SAFB based on the engine speed NE and the engine load factor KL is calculated. Subsequently, in step S310, the value of a WGV opening degree correction coefficient KS is calculated based on the WGV opening degree. Moreover, in step S320, the product obtained by multiplying the base correction amount SAFB by the WGV opening degree correction coefficient KS is calculated as the value of the correction amount SAF of the catalyst AF.

Note that the calculation of the base correction amount SAFB in step S300 is performed with reference to the calculation map of the base correction amount SAFB stored in advance in the storage device of the engine control device 50. In this calculation map, the value of the correction amount SAF of the catalyst AF at each operation point in a state where the WGV opening degree is the steady value at each operation point of the engine 10 is stored.

Figure 15:
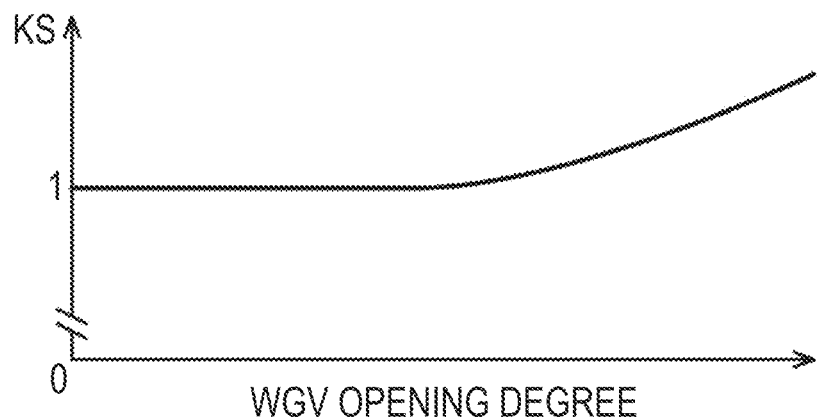
FIG. 15 is a graph showing a relationship between a WGV opening degree and a WGV opening degree correction coefficient.

FIG. 15 shows a relationship between the WGV opening degree and the WGV opening degree correction coefficient KS in the calculation map used for the calculation of the WGV opening degree correction coefficient KS in step S310. Note that the calculation map of the WGV opening degree correction coefficient KS is also stored in advance in the storage device of the engine control device 50. As shown in FIG. 15, when the WGV opening degree is smaller than a certain value, the value of the WGV opening degree correction coefficient KS is "1". Moreover, as the WGV opening degree is increased from a certain value, the value of the WGV opening degree correction coefficient KS is gradually increased from "1".

Even by the calculation of the correction amount SAF of the catalyst AF in the present embodiment, when the WGV opening degree is large, the target air-fuel ratio AFT is corrected to be the air-fuel ratio on the rich side with respect to the air-fuel ratio in a case where the WGV opening degree is small. As a result, also in the present embodiment, the same operations and effects as those in the first embodiment can be obtained.

The present embodiment described above can be modified and carried out as follows. The present embodiment and the following modification examples can be carried out in combination with each other within a technically consistent range.

In step S150 of FIG. 3 or step S220 of FIG. 13, the correction amount SAF of the catalyst AF may be calculated by using the WGV opening degree instead of the supercharging pressure PB.

The calculation of the correction amount SAF of the catalyst AF in step S220 of FIG. 13 may be performed in the calculation process of FIG. 14.

In the embodiments described above, the occurrence of both the lean failure and the rich failure in the air-fuel ratio sub F/B process P3 is confirmed based on the rear air-fuel ratio RrAF. The occurrence of any one of the lean failure and the rich failure may be confirmed without being based on the rear air-fuel ratio RrAF. For example, the occurrence of the lean failure that does not depend on the rear air-fuel ratio RrAF can be confirmed by the following aspect. An integrated value of the deviations of the front air-fuel ratio FrAF and the stoichiometric air-fuel ratio in the period of time from when the lean combustion is started to when the lean failure occurs is a value corresponding to a total amount X of the oxygen stored by the first catalyst device 40 during the same period of time. On the other hand, an integrated value of the deviations of the front air-fuel ratio FrAF and the stoichiometric air-fuel ratio in the period of time from when the rich combustion is started to when the rich failure occurs is a value corresponding to a total amount Y of the oxygen released from the first catalyst device 40 during the same period of time. Moreover, when there is no change in the upper limit value MAX of the oxygen storage amount OSA of the first catalyst device 40, the total amount X and the total amount Y should be the same value. Therefore, for example, the integrated value of the deviations of the front air-fuel ratio FrAF and the stoichiometric air-fuel ratio during the period of time from when the rich combustion is started after a fuel cut recovery to when until the occurrence of the rich failure is confirmed from the rear air-fuel ratio RrAF is obtained. Moreover, when the integrated value of the deviations of the front air-fuel ratio FrAF and the stoichiometric air-fuel ratio after the lean combustion is started reaches the obtained value, the engine control device determines that the lean failure has occurred. In an aspect similar to the above, it is also possible to confirm the occurrence of the rich failure regardless of the rear air-fuel ratio RrAF.

What is claimed is:

1. An engine control device applied to an engine including
a combustion chamber in which an air-fuel mixture is combusted,
an intake passage through which an intake gas introduced into the combustion chamber flows,
an exhaust passage through which an exhaust gas generated by combustion of the air-fuel mixture in the combustion chamber flows,
a turbocharger including a compressor installed in the intake passage and a turbine installed in the exhaust passage,
an injector configured to inject a fuel in the intake gas,
a catalyst device for exhaust gas cleaning installed on a downstream side portion of the turbine in the exhaust passage, the catalyst device supporting a three-way catalyst and having an oxygen storage capacity,
a front air-fuel ratio sensor installed on an upstream side portion of the catalyst device in the exhaust passage, and a rear air-fuel ratio sensor installed on a downstream side portion of the catalyst device in the exhaust passage, wherein:

the turbine includes
- a turbine wheel configured to rotate in response to a flow of the exhaust gas,
- a bypass passage that bypasses the turbine wheel and allows the exhaust gas to flow, and
- a wastegate valve for changing a flow passage area of the exhaust gas of the bypass passage; and the engine control device is configured to perform
- an air-fuel ratio main feedback process of performing a feedback control of a fuel injection amount of the injector based on an output of the front air-fuel ratio sensor such that an air-fuel ratio of the air-fuel mixture combusted in the combustion chamber is made to a target air-fuel ratio,
- an air-fuel ratio sub feedback process of alternately switching the target air-fuel ratio between a rich side target air-fuel ratio that is an air-fuel ratio on a rich side with respect to a stoichiometric air-fuel ratio and a lean side target air-fuel ratio that is an air-fuel ratio on a lean side with respect to the stoichiometric air-fuel ratio, and deciding switching timing of the target air-fuel ratio based on an output of the rear air-fuel ratio sensor, and
- a catalyst air-fuel ratio correction process of, when an opening degree of the wastegate valve is large, correcting the target air-fuel ratio to be the air-fuel ratio on the rich side with respect to the air-fuel ratio when the opening degree is small.

2. The engine control device according to claim 1, wherein the catalyst air-fuel ratio correction process is performed on a condition that a control of the opening degree of the wastegate valve is not able to be normally performed.

3. The engine control device according to claim 2, wherein the engine control device is configured to, when the control of the opening degree of the wastegate valve is able to be normally performed, set a correction amount of the target air-fuel ratio based on an engine speed and an engine load factor.

4. The engine control device according to claim 1, wherein the catalyst air-fuel ratio correction process is performed by setting a correction amount of the target air-fuel ratio based on an engine speed, an engine load factor, and a supercharging pressure.

\* \* \* \* \*